I. G. SALLEE.
WAGON BODIES AND FRAMES.

No. 176,893. Patented May 2, 1876.

UNITED STATES PATENT OFFICE.

ISAAC G. SALLEE, OF MONTGOMERY, KENTUCKY.

IMPROVEMENT IN WAGON BODIES AND FRAMES.

Specification forming part of Letters Patent No. 176,893, dated May 2, 1876; application filed March 21, 1876.

*To all whom it may concern:*

Figure 1:
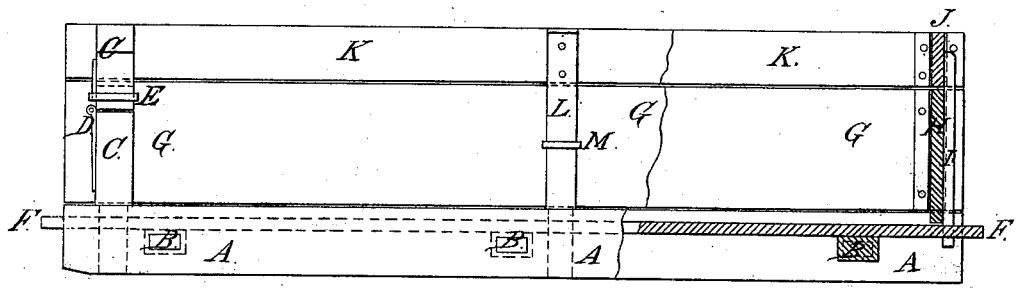
Figure 2:
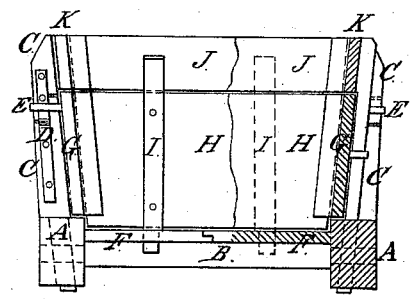

Be it known that I, ISAAC G. SALLEE, of Montgomery, in the county of Trigg and State of Kentucky, have invented a new and useful Improvement in Combined Body and Frame for Wagons, of which the following is a specification:

Figure 1 is a side view, partly in section, of my improved body and frame. Fig. 2 is an end view partly in section of the same.

Similar letters of reference indicate corresponding parts.

The object of this invention is to furnish an improved body and frame for wagons, which shall be so constructed that the body may be detached without affecting the frame, so that the wagon may be used with a frame or a body, as may be desired.

The invention consists in the combination of the bottom boards, the side boards, and the end boards, with the frame in the uprights of a wagon frame, made in two parts connected with each other by the hinges and bands, as hereinafter fully described.

A are the side bars, and B are the cross-bars, of the frame, which rests upon the bolsters in the usual way. C are the stakes or uprights of the frame, which are made in two parts, having their adjacent ends halved to to each other, and connected at their edges by hinges D, and which are secured, when in line with each other, by bands E slipped down upon the halved part of said ends. The hinged parts of the uprights C keep the box or extension body in place when used, and when the frame is used without the body they may be turned down for convenience in loading rails or similar loading upon the frame. F are the bottom boards, which rest upon the cross-bars B of the frame. G are the side boards, which rest upon the side bars A and against the upright C, and are kept in place by the end boards H, the ends of which are placed between cleats attached to the side boards G. The cleats I of the end boards H project downward to pass through holes in the bottom boards F, to keep them in place, and project upward to support the end board J of the top or extension box, when used. The side boards K of the extension-box are supported by the uprights C, and are kept in place by cleats L attached to them, which pass through keepers M attached to the side boards G, and enter holes in the side bars A.

Having thus described my invention, I claim as new and desire to secure by Letters Patent—

1. The combination of the bottom boards F, the side boards G, and the end boards H with the frame A B C, substantially as herein shown and described.

2. The uprights C, of a wagon-frame, made in two parts connected with each other by the hinges D and bands E, substantially as herein shown and described.

ISAAC G. SALLEE.

Witnesses:
JAMES C. CARLOSS,
W. T. CARLOSS.